C. J. REED.
PROCESS OF REMOVING TIN FROM SCRAP.
APPLICATION FILED JULY 13, 1909.
950,115.
Patented Feb. 22, 1910.
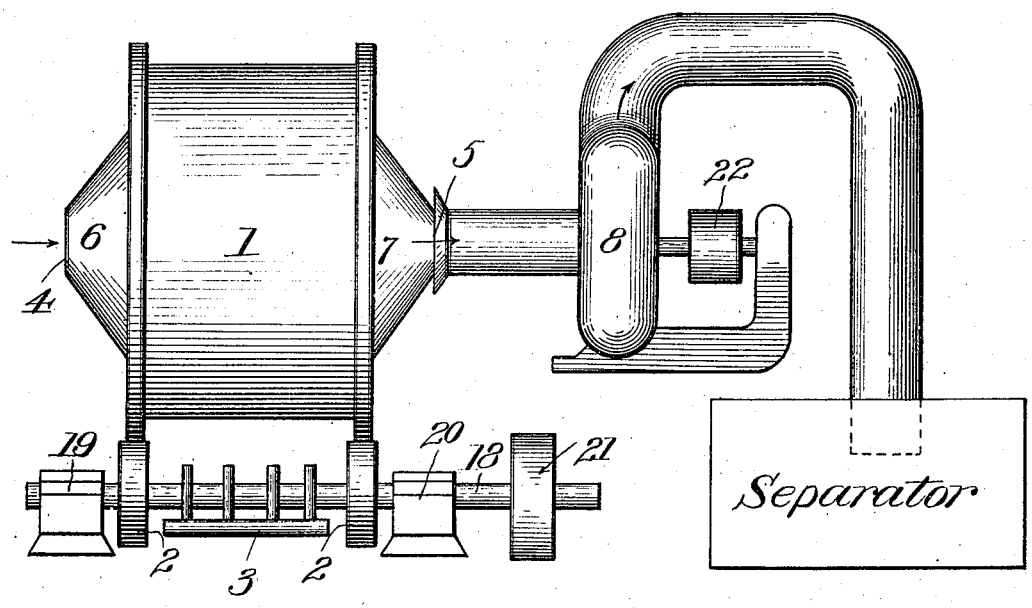
Witnesses
C. H. Walker
N. P. Leonard.
Inventor
Charles J. Reed
By Byrnes Townsend & Brickenstein
Attorneys

UNITED STATES PATENT OFFICE.

CHARLES J. REED, OF PHILADELPHIA, PENNSYLVANIA.

PROCESS OF REMOVING TIN FROM SCRAP.

950,115.

Specification of Letters Patent.   Patented Feb. 22, 1910.

Application filed July 13, 1909.   Serial No. 507,382.

*To all whom it may concern:*

Be it known that I, CHARLES J. REED, a citizen of the United States, residing at Philadelphia, in the county of Philadelphia and State of Pennsylvania, have invented certain new and useful Improvements in Processes of Removing Tin from Scrap, of which the following is a specification.

This process is intended for the separation of mixed metals, particularly of tin from tinned metals, as for example iron. The process comprises three steps, namely: first, removing the tin in pulverulent or subdivided form from the iron or other coated metal by agitating a charge containing the tinned metal and a subdivided foreign body; second, removing the pulverized tin from the foreign body and from the detinned iron by means of a current of air, steam or gas; third, removing the foreign body from the detinned iron.

In carrying out the first step in the process advantage is taken of the fact that metallic tin is rendered weak, friable and easily pulverized by heating the charge, preferably to about the melting point of tin. The subdivided foreign body used to pulverize or wipe off the fused or softened tin may be any substance which is infusible and non-volatile under the conditions of use. I prefer, however, to use a substance of great density and one which is inert toward both the tin and the iron under the conditions employed. By "inert" I mean incapable of uniting with as an alloy or combining with chemically. I find that magnetite having a specific gravity of about 5, or magnetic oxid of iron, in a finely divided condition is very suitable for use as the foreign body. I also find that finely divided metallic iron is very suitable. I do not limit myself, however, to any particular substance.

The fineness or extent of subdivision of the foreign body is variable, but I prefer material crushed until it passes a screen having holes not more than one-thirtieth of an inch in diameter, but I do not limit myself to any particular size, having successfully used material more than one-fourth of an inch in diameter. The amount of the foreign body added to the charge is also variable within wide limits, one to ten and one to one-tenth having been used, but I prefer about equal volumes of the tin scrap and foreign body. I do not, however, limit myself to any particular proportions.

The second step of the process consists in removing the pulverized tin from the foreign body and detinned iron by means of a current of air, steam or gas. This operation may be carried on simultaneously with the pulverizing operation or as a subsequent operation. I prefer to do it simultaneously by causing a current of air to pass through the apparatus in which the pulverizing takes place. This current of air is then projected into a separating or settling chamber in which the particles of tin settle by gravity on the floor, or the air is passed through a series of bags or screens of textile or other suitable material in which the tin is collected in the form of a powder of metallic tin or oxid of tin. The air or other gas may be heated to the proper temperature, if desired.

The third step in the process consists in screening the residual mass on a screen capable of allowing the subdivided foreign body to pass through, while rejecting the detinned iron or the principal part of it. The foreign body may then be used over again indefinitely.

A convenient form of apparatus for carrying out the process is shown in the accompanying drawing, in which 1 represents a hollow cylinder of iron or steel mounted to revolve on rollers 2, carried by a shaft 18, supported in bearings 19, 20 and driven by a pulley 21. The drum is mounted over a suitable source of heat, diagrammatically shown as a series of gas burners, and has two openings 4 and 5 at the apexes of terminal cones 6 and 7. The opening 4 may be used for charging in the tinned iron and foreign body and also for discharging the detinned product.

8 represents an exhaust fan driven by a pulley 22 and adapted to cause a suction current of air through the drum and fan in the direction indicated by the arrows.

I do not limit myself to any particular method of separating the tin dust from the air but may use any of the well known methods of separating dust from air, such as a centrifugal separator or the blowing of the dust into or through water.

In the preferred operation of my process a body of tin scrap is mixed with an equal volume of finely divided magnetite and the mixture is charged into the drum 1, through the opening 4, wherein it is subjected to heat and agitation until the tin is entirely removed from the iron. At the same time the fan 8 is operated to draw a current of air through the system in the direction indicated by the arrows until all of the tin is removed. I prefer to use a temperature a few degrees above the melting point of tin, but not high enough to cause excessive oxidation of the tin. When the tin has been removed as completely as may be necessary the remaining products are removed through the opening 4 and a new charge inserted.

My process is not limited to the separation of tin, but is applicable also to lead, zinc, solder, babbitt and all metals which may be easily pulverized by agitation with heat in the presence of a subdivided foreign body.

While I have in the claims specifically referred to "air," as the gas which I prefer to use as the separating means, I wish that term to be understood as including any other suitable gaseous medium.

I claim:

1. The process of separating metals which consists in heating and agitating the mixture with a subdivided foreign body and removing one of the metals as a powder by means of a current of air.

2. The process of separating metals which consists in heating the mixture with a subdivided foreign body to a temperature about the melting point of one metal, agitating the mass while hot and removing one of the metals as a powder by means of a current of air.

3. The process of separating metals which consists in heating and agitating the mixture with a subdivided foreign body, removing one of the metals as a powder with a current of air and separating the foreign body from the unpowdered metals.

4. The process of separating metals which consists in heating and agitating the mixture with a foreign body having a specific gravity greater than four; removing one of the metals as a powder with a current of air, and separating the foreign body from the unpowdered metal.

5. The process of separating metals which consists in heating and agitating the mixture with subdivided magnetite, removing one metal as a powder by means of a current of air, and separating the magnetite from the unpowdered metals.

6. The process of detinning tin-plate, which consists in heating and agitating the tin scrap with a subdivided foreign body to remove the tin and separating the powdered tin by means of a current of air.

7. The process of detinning tin-plate which consists in agitating the tin-plate with a subdivided foreign body while heated to a temperature near the melting point of tin and removing the powdered tin by means of a current of air.

8. The process of detinning tin-plate which consists in agitating the tin-plate with a subdivided foreign body while heated to a temperature near the melting point of tin, removing the powdered tin by means of a current of air, and separating the foreign body from the detinned metal.

9. The process of detinning tin-plate which consists in heating and agitating the tin scrap with a subdivided foreign body having a specific gravity greater than 4, to remove the tin and separating the powdered tin by means of a current of air.

10. The process of detinning tin-plate which consists in agitating the tin-plate together with subdivided magnetite while heated to about the melting point of tin, and separating the powdered tin by means of a current of air.

11. The process of detinning tin-plate which consists in agitating the tin-plate together with subdivided magnetite while heated to about the melting point of tin, separating the powdered tin by means of a current of air, and then separating the magnetite from the detinned metal.

In testimony whereof, I affix my signature in presence of two witnesses.

CHARLES J. REED.

Witnesses:
ELLEN M. RITTER,
JOHN W. RITTER.